July 14, 1970     D. L. SHEPHARD     3,520,041
CUTOFF BLADE
Filed Aug. 28, 1969
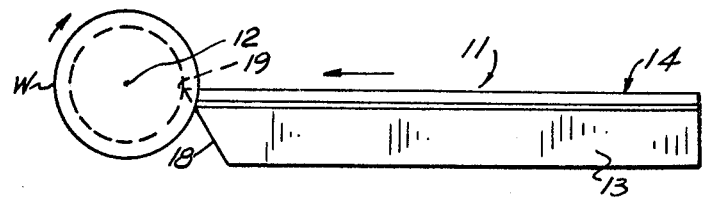
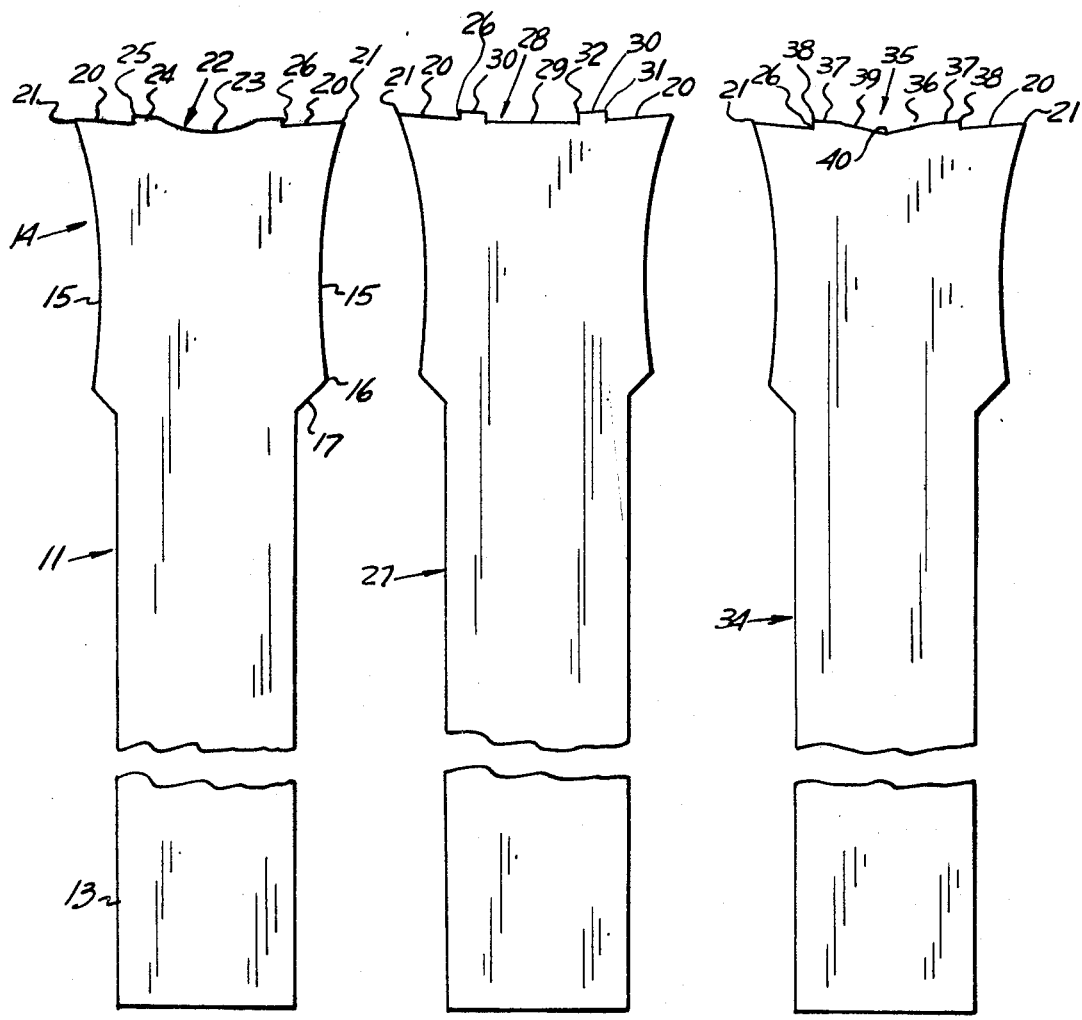
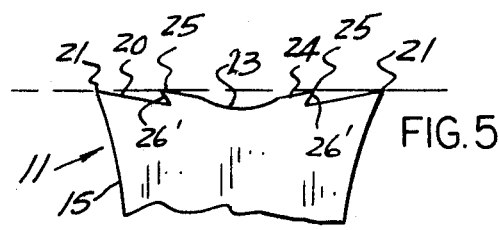
INVENTOR
DONALD L. SHEPHARD
ATTORNEYS

United States Patent Office
3,520,041
Patented July 14, 1970

3,520,041
CUTOFF BLADE
Donald L. Shephard, 11500 Lambs Road,
Memphis, Mich. 48041
Filed Aug. 28, 1969, Ser. No. 853,760
Int. Cl. B23p *15/28;* B26d *1/00*
U.S. Cl. 29—95      7 Claims

ABSTRACT OF THE DISCLOSURE

In a cutoff blade with uniform body and enlarged head, wherein the leading edge is cut away downwardly and rearwardly to define at the top juncture, a transverse irregularly shaped cutting edge uniform throughout the head length and wherein the edge has a cross-section defined by a plurality of interrupted hollow ground individual cutting surfaces and a centrally grooved central section to provide a plurality of separate cutting edges and cutting corners and to thus provide in the cutoff work piece, a corresponding number of arcuate chip elements.

BACKGROUND OF THE INVENTION

In the use of cutoff tools for severing lengths from a normally cylindrical work piece rotated on a longitudinal axis, there is very often the problem of overheating due to the fact that the chips cut during the cutting off action are of such definition as to become partly wedged within the groove cut, causing unnecessary heating, unnecessary forces and excessive wear and a premature wearing out of the cutting off blade.

Various efforts have been made to provide an improved cutoff blade and wherein, it is sought to control the shape of the chips cut so as to reduce wear, reduce heating and to prevent clogging of the channel or groove in the work piece defined by the transversely movable cutoff blade as the work piece is rotated.

In my earlier U.S. Pat. No. 3,320,653 dated May 23, 1967 entitled, "Cutoff Blade," the problem was faced by providing a transverse irregularly shaped leading cutting edge provided within the head of the cutoff blade throughouts its length which provided a limited number of cutting surfaces and corresponding cutting corners to provide for an improved cutoff operation and for the formation of multiple chips.

The present invention has for its object, an improvement in the cross-sectional shape of the cutting edge to provide for increased cutting surfaces and increased cutting corners by which an improved result is achieved by providing for an increased number of chip elements formed from a single transverse cutting edge and wherein, with this increased number of cutting edges and cutting corners, an improved cutting off operation is achieved with more brake up of the chip, a better ejection of the chip and less overheating and longer wear.

THE DRAWING

FIG. 1 in the drawing illustrates in side elevational view, the present cutoff blade as fed radially into and at right angles to the rotating work piece axis for cutting off a part thereof.

FIG. 2 is a fragmentary end elevational view of the cutoff blade, shown on an enlarged scale.

FIG. 3 is a similar view of a modification.

FIG. 4 is a similar view of another modification.

FIG. 5 is a fragmentary view of a modification of FIG. 2.

DETAILED DESCRIPTION

Referring to the drawing, FIG. 1 shows the present cutoff blade 11 adapted to be fed in the direction of the arrow at right angles to the longitudinal axis 12 of power rotated work piece W for the purpose of cutting off a portion of the length thereof or of forming an annular groove therein.

The present cutoff blade includes an elongated metal body 13 of uniform cross-section, and along one edge thereof, a head 14, also of uniform cross-section but of a width greater than said body.

As shown in FIG. 2, the opposing side edges of said head are hollow ground at 15 extending from cutting corners 21 at the top and terminating in the elongated ridge 16, the latter terminating in the inwardly inclined tapered portion 17 which merges with body 13.

The opposed ridges 16 are spaced inwardly of cutting corners 21, but outward from the narrowest portion of said head as best shown in FIG. 2 for the purpose of providing proper clearance and relief when cutting into the work piece as shown in FIG. 1.

The leading end 18 of the cutoff blade is cut away downwardly and inwardly extending from said head, FIG. 1 to thus provide at the juncture with said head at its top the transverse cutting edge 19, whose cross-sectional shape in a preferred embodiment is shown on an increased scale at FIG. 2.

The said cutting edge is defined in FIG. 2 as to include a pair of opposed, parallel, hollow ground outer cutting edges 20 which define with the head sides 15 the outer cutting corners 21. The cutting edge includes a center section generally indicated at 22, having a depression 23 which is arcuate in FIG. 2 but of a different shape in FIGS. 3 and 4.

The center section thus includes a pair of opposed parallel inner hollow ground cutting edges 24. Also the pair of inner cutting corners 25 and adjacent thereto radial edge portions 26 which extend down to the lowermost portion of the outer cutting edges 20.

The arcuate depression 23 between inner cutting edges 24 thus provides a fifth cutting surface forming a part of the transverse cutting edge 19, there being the additional outer cutting edges 20 and the inner cutting edges 24. All four cutting corners 21–25 lie in the same plane.

MODIFICATION NO. 1

Referring to FIG. 3, the cutoff blade 27 is substantially the same as cutoff blade 11 of FIG. 2 except that there is some modification in the central section 28 whose depression 29 is flat throughout its width.

Said depression at its edges thus defines with the inner cutting edges 30 an additional pair of central cutting corners 32. The outer portion of the central section 28 at the outer extremity of the inner cutting edges 30 provides the corresponding inner cutting corners 31.

Here also the transverse cutting edge includes a series of cutting surfaces 20, 30, 29, 30 and 20, i.e. five cutting surfaces. All four cutting corners 21–31 are in substantially the same plane.

MODIFICATION

The modified cutoff blade 34, FIG. 4 has a different central section 35 which includes the above construction with respect to FIG. 1 but, additionally, the depression 36 is defined by a pair of inwardly and downwardly converging cutting edges 39. These edges at their outer extremity merge with inner cutting edges 37 whose outer edges include cutting corners 38. All four cutting corners 21–38 are coplanar.

The central tapered cutting edges 39 thus provide a central elongated root 40 which might correspond to or be regarded as an additional cutting corner along with cutting corners 21 and 38 to thus provide five continuous cutting corners and a succession of interrupted six transverse cutting edges; namely, the two outer cutting edges 20, the pair of inner cutting edges 37, and the pair of inclined cutting edges 39.

Accordingly, with this cross-sectional shape of the transverse cutting edge 19, FIG. 1, it is possible to produce in the work piece as it is rotated with respect to the cutting tool moving radially inward towards its longitudinal axis of five or even six broken up chips; each of which will be partly arcuate in view of the hollowed ground character of the cutting edges 20 and 37.

There is always a certain amount of friction and heating of the chips during the cutting action with the result that the chips tend to curl further and thus, are more apt to and are more easily projected automatically out of the channel cut into the work piece as shown in FIG. 1 to thus, prevent an accumulation of chips within said channel to minimize overheating and where, particularly as to the cutting corners, essentially the outer cutting corners 21 to thus provide for a longer blade life.

While side edges 26 adjacent cutting corners 25, FIG. 2, cutting corners 31, FIG. 3, and cutting corners 38, FIG. 4, are shown substantially parallel to the tool axis, these edges may be inclined downwardly and inwardly as at 26', FIG. 5, within the range of 30–45 degrees.

Having described my invention, reference should now be had to the following claims.

I claim:

1. A cutoff blade comprising an elongated body of uniform cross-section;

a head of uniform cross-section extending along one side edge of the body throughout its length;

said head being of greater width than said body;

the forward end of said body and head being angularly cut away rearwardly and downwardly from said head defining a leading transverse cutting edge across its forward extremity;

and a preformed cutting surface formed in the outer edge face of said head of uniform shape throughout its length;

the cross-sectional form of said cutting surface including:

a pair of spaced opposed outer hollow ground cutting edges of gradually increasing depth towards the head axis defining a pair of outer cutting corners;

and an upright center section including a pair of spaced opposed inner hollow ground cutting edges of gradually increasing depth toward the head axis defining a pair of inner cutting corners;

said inner cutting edges at said inner cutting corners, terminating in radial side walls substantially parallel to the blade axis;

said inner cutting edges remote from said inner cutting corners terminating in a depressed portion whose maximum depth lies in a plane spaced below a plane passing through said outer cutting corners and below the lowest portion of said outer cutting edges.

2. In the cutoff blade of claim 1, said depressed portion being arcuate.

3. In the cutoff blade of claim 1, said depressed portion being flat, defining with said inner cutting edges, radial inner side walls substantially parallel to the blade axis.

4. In the cutoff blade of claim 1, said depressed portion being defined by a pair of flat inwardly and downwardly converging walls having a central elongated root.

5. In the cutoff blade of claim 1, the opposite side walls of the head being hollow ground and converging from said outer cutting corners toward the body axis;

the lower longitudinal edges of said side walls being inward of said outer cutting corners, but outward of central portions of said wall walls for maximum chip clearance and release during the cutting off operation.

6. In the cutoff blade of claim 1, the multiple inner and outer cutting edges and the multiple inner and outer cutting corners, and the cutting edge defined by said depressed portion adapted to cut five to six individual arcuate chips from the work piece, adapted to curl on heating for reduced friction and ejection from the groove cut in said work piece.

7. In the cutoff blade of claim 1, the side walls adjacent said inner cutting corners being inclined downwardly and inwardly in the range of 30–45 degrees from the vertical.

References Cited

UNITED STATES PATENTS

| 2,688,791 | 9/1954 | Lvers et al. | 29—95 |
| 2,891,300 | 6/1959 | Shephard | 29—95 |

HARRISON L. HINSON, Primary Examiner